United States Patent
Rignell (10) Patent No.: US 6,304,752 B1
(45) Date of Patent: *Oct. 16, 2001

(54) METHOD AND ARRANGEMENT IN A TELECOMMUNICATION SYSTEM

(75) Inventor: Mårten Rignell, Dalby (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,490

(22) Filed: Jan. 13, 1998

(30) Foreign Application Priority Data

Jan. 14, 1997 (SE) .................................... 9700001

(51) Int. Cl.[7] .................................... H04M 11/00
(52) U.S. Cl. .................... 455/403; 455/466; 455/422
(58) Field of Search .................. 455/403, 422, 455/466; 704/466

(56) References Cited

U.S. PATENT DOCUMENTS

| | | | | |
|---|---|---|---|---|
| 5,396,537 | * | 3/1995 | Schwendeman | 455/31.3 |
| 5,455,965 | * | 10/1995 | Shaughnessy et al. | 455/503 |
| 5,826,030 | * | 10/1998 | Herbert | 395/200.58 |
| 5,878,397 | * | 3/1999 | Stille et al. | 704/466 |
| 5,930,239 | * | 7/1999 | Turcotte | 455/466 |
| 6,134,618 | * | 10/2000 | Herbert | 710/105 |

FOREIGN PATENT DOCUMENTS

506430 C2    11/1997   (SE) .

OTHER PUBLICATIONS

International Search Report dated May 5, 1998.

* cited by examiner

*Primary Examiner*—Daniel Hunter
*Assistant Examiner*—C. Chow
(74) *Attorney, Agent, or Firm*—Burns, Doane, Swecker & Mathis, L.L.P.

(57) ABSTRACT

A method and means for controlling transmission of non real-time critical messages between communication stations in a telecommunication system are disclosed. Associated with the message is an information block which comprise information about when the message is to be transmitted, as well as information regarding actions to perform in an event of failed transmission. An inventive method comprises steps that give the user flexibility in terms of interaction with the control of message transmission. Interrupted message transfer can be automatically resumed or re-scheduled on demand from the user.

24 Claims, 6 Drawing Sheets

METHOD AND ARRANGEMENT IN A TELECOMMUNICATION SYSTEM

This application claims priority under 35 U.S.C. §§119 and/or 365 to SE 970001-2 filed in Sweden on Jan. 14, 1997; the entire content of which is hereby incorporated by reference.

TECHNICAL FIELD OF THE INVENTION

The present invention relates to a method and an apparatus for transmitting messages in mobile communication systems, particularly control of transmission of messages between mobile communication stations and fixed location communication stations in a mobile telephone system.

DESCRIPTION OF RELATED ART

Modern mobile telephone systems have, in addition to supporting transmissions that are critical with respect to real-time, such as e.g. voice-calls, the ability to convey non real-time critical messages to and from mobile communication stations. Typical examples are the so-called Short Message Service in the GSM system and the possibility to send and receive fax and electronic mail messages with a mobile telephone.

When incorporating more and more capabilities for non real-time critical message transfer in mobile communication networks, it is necessary to incorporate easy-to-use functions for keeping track of outgoing and incoming messages. Since radio communication in a mobile communication network is impaired by many factors, such as changes in signal strength, multipath fading, user switching off the equipment etc., transfer is often interrupted for shorter or longer time periods. In an environment with many interruptions of communication, a user of present technology in mobile communication stations must constantly monitor the progress of transmission of each and every message. If contact is lost for even a short period of time during the transmission, the message is lost. Usually the message which is to be transmitted is stored in the mobile communication station, and can easily be retrieved. But it must be retransmitted on a n explicit command from the user. In a situation when many messages are to be transmitted and the radio environment is marred by repeated degradation it is obvious that it is a tedious task for a user to monitor the transmission and several times having to re-transmit messages.

In WO 95/03679 is disclosed a method and an apparatus for controlling data transfer in cellular communication systems. Problems with overcrowded communication channels are ameliorated. This is done by associating priority codes with each data transmission. The communication system monitors the communication conditions in the system, including crowding of channels. If overcrowding is detected, the system decides, based on the priority code, if the data transmission is to be ceased.

A drawback of the invention presented in WO 95/03679 is that it addresses the situation of overcrowding, and is thus dependent on monitoring functions in a cell site (i.e. a radio base station).

SUMMARY OF THE INVENTION

A statement of the problem, in general terms, addressed by the present invention is how to facilitate the control of when a message is transmitted to or from a mobile communication station. Particularly the problem is how to control and monitor transmission of multiple non real-time critical messages in situations when transmission is prematurely interrupted.

Within the scope of the general problem, as stated above, a number of sub-problems can be identified. Initially, there is a problem of how to supply a user of a mobile communication station with an ability to preset a time for transmission of a message, freeing the user from further interaction until the message has been transmitted. Secondly, there is a problem of supplying the user with an ability to enable and disable automatic transmission of messages that have preset times for transmission and also enabling the user to change the time of transmission.

The present invention addresses the problems as described above, having a purpose of facilitating control and monitoring of non-voice message transmission in a mobile communication system. No particular preference is expressed with respect to the type of communication system. The invention can be applied in digital systems such as, for example, GSM, PCS, D-AMPS or CDMA systems, as well as analog systems such as AMPS, TACS and NMT.

The invention is realized by methods and means to create and edit information blocks associated with the messages, together with methods and means to monitor and control transmission of the messages.

A method according to the invention relates to transmission of messages from a first communication station to a second communication station. The first communication station is capable of controlling transmission, capable of keeping track of current time, capable of message generation and capable of transmitting. At least one message containing textual data is generated in the first communication station together with an information block which is associated with the message. An inventive method comprises a step of generating in said information block a transmission time stamp, said time stamp comprising information about a point in time when the message is to be transmitted. In another step a comparison of the transmission time stamp with the current time is made, followed by an interpretation of the result of the comparison and as a consequence of the interpretation commencing a transmission of the message from the first communication station to the second communication station. Editing of the information block is also possible.

An advantage of the invention is that it is possible for a user of a communication station to create messages, store the messages along with information about when the message is to be transmitted, and then leave the responsibility of transmission of the messages to the communication station in accordance with the inventive method and means.

Preferred embodiments of the present invention will now be described in detail, referring to drawings as specified below.

DETAILED DESCRIPTION OF PREFERRED EMBODIMENTS

Figure 1:
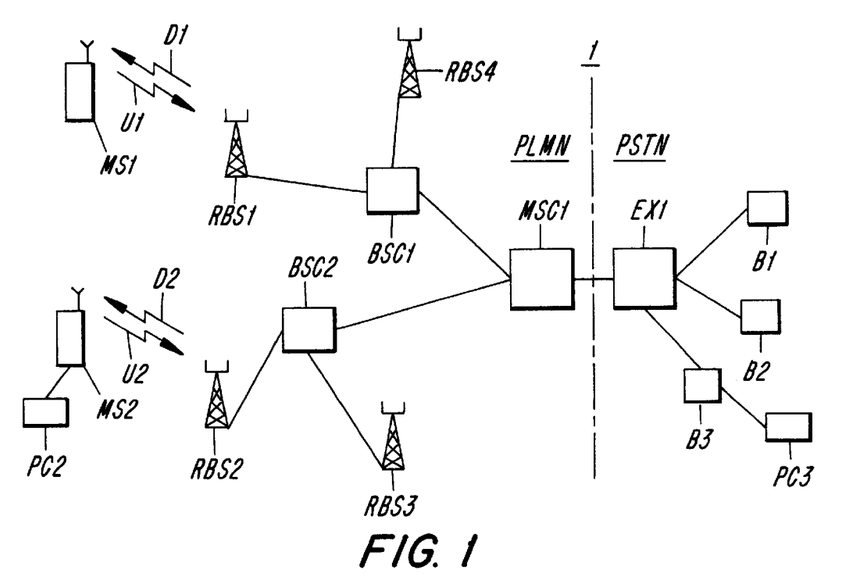
FIG. 1 shows a schematic view of a telecommunication system.

FIG. 1 shows one example of a telecommunication system 1 in which the present invention can be implemented. FIG. 1 will serve as a reference in the following description of embodiments of the invention. It should be noted, though, that by no means is an implementation of the present invention restricted to the system 1 exemplified in FIG. 1. Telecommunication systems in general comprises many more components than those shown in FIG. 1. Only those components needed to illustrate the normal function of the system and the invention have been included. Also, no restriction is intended in terms of standards. It is implementable in any standard of mobile telecommunication systems, such as e.g. GSM and AMPS/D-AMPS, where a message service exist.

The telecommunication system 1 comprises two parts: a mobile telecommunication system PLMN and a fixed station system PSTN. The mobile system p art PLMN comprises a switching center MSC1 to which two radio base station controllers BSC1,BSC2 are connected, a first controller BSC1 and a second controller BSC2. The base station controllers BSC1,BSC2 each have connected to them two radio base stations RBS1,RBS4 and RBS2,RBS3 respectively. The first RBS1 and the fourth RBS4 station are connected to the first base station controller BSC1, and the second RBS2 and the third RBS3 station are connected to the second base station controller BSC2. The mobile system also comprises a number of mobile communication stations, a first mobile station MS1 and a second mobile station MS2. The mobile stations MS1,MS2 can be of any type, e.g. simple hand-held mobile phones as indicated by the first mobile station MS1, and of more elaborate configuration as indicated by the second mobile station, to which a computer PC2 is connected.

Connected to the mobile system PLMN is the fixed station system PSTN. The systems PLMN,PSTN are connected via the mobile switching center MSC in the mobile network PLMN and a fixed system switching center EX1. To the fixed switching center EX1 a number of subscriber stations B1,B2 are connected. A typical example of a subscriber station is a tele; phone. However, also in the fixed system PSTN, a subscriber station B3 can be of more elaborate configuration, such as the station B3 which has a computer PC3 connected to it.

Connections between the different units in the telecommunication system 1 are implemented using techniques known in the art, and can vary depending on what communication standards are used in the systems. The first mobile station MS1 is in contact with the first radio base station RBS1 through two radio channels U1,D1. A first mobile station up-channel U1 which carries information from the first mobile station MS1 to the first base station RBS1, and a first mobile station down-channel D1 which carries information to the first mobile station MS1 from the first base station RBS1. The channels U1,D1 can be implemented as different radio carrier frequencies, such as in the AMPS and the NMT standards. The channels U1,D1 can also be implemented in digital systems as time slots, or parts of time slots, in systems comprising time division multiplex (TDMA) such as GSM and D-AMPS, or in CDMA channels. Similarly, the connections between the second mobile station MS2 and the second radio base station RBS2 are implemented in a second up-channel U2 and a second down-channel D2.

The connections between the base stations RBS1–RBS4 and their respective base station controller BSC1 and BSC2, as well as the connections between all other units in the system 1, are implemented using well known telecommunication techniques, are outside the scope of this disclosure, and will hence not be discussed further.

Naturally, the number of mobile stations that can be served by the mobile system PLMN, and the number of subscriber stations connected to the fixed system PSTN are generally much higher than the numbers shown here.

The present invention discloses how flow of information, in a form of non-voice messages, to and from the mobile communication stations MS1,MS2 is controlled in order to gain the advantages as described above.

In the following, a terminology will be used where references to messages will comprise all non real-time critical types of messages. Examples of messages in this category are: fax messages, electronic mail messages, data files containing text, images or sounds. In contrast to these (non real-time critical) messages there are transmissions that are critical with respect to real-time transfer. The most common example being an ordinary voice call from one subscriber to another in a network. Thus, the two different types of information transfer discussed in the following description will be messages and voice calls respectively.

Figure 2:
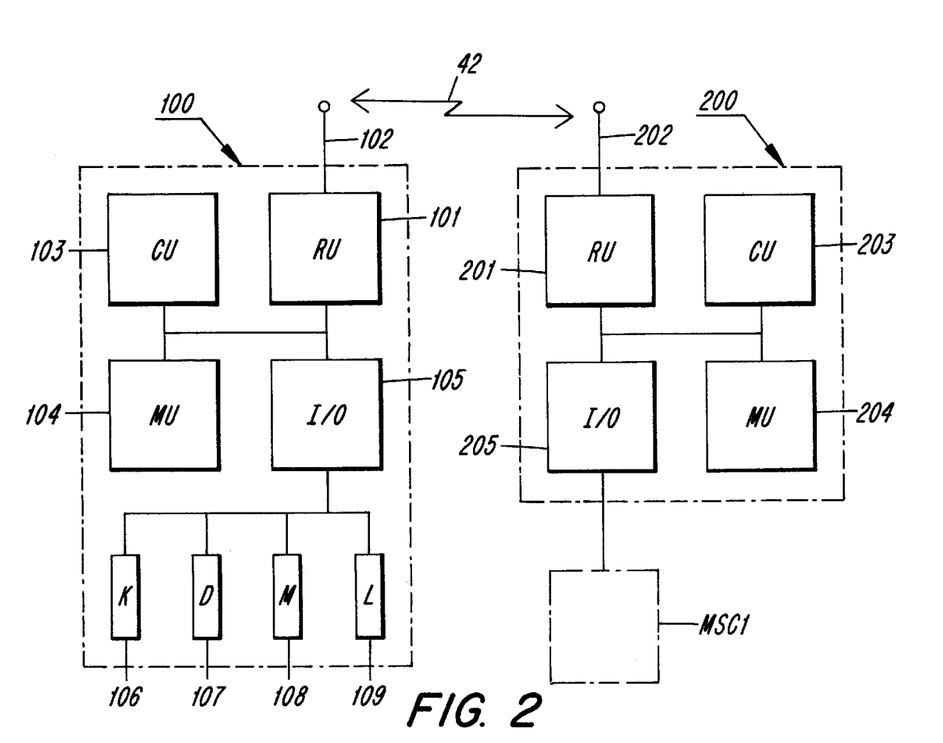
FIG. 2 shows a schematic block diagram of two communication stations.

FIG. 2 discloses, schematically, two communication stations a primary communication station 100 and a secondary communication station 200. Referring back to FIG. 1, the first mobile station MS1 can have the characteristics of the primary station 100, but there is no direct equivalence between the two. Rather, the primary station 100 as it will be disclosed, can be seen as a "generic" mobile communication station, capable of handling non-voice messages in a mobile telecommunication system. The dashed box bounding the different units in the primary station 100 indicates that it is a grouping of individual functional units that make up the station 100. It is not necessary for the units to be within a single physical casing or box.

The secondary station 200 in FIG. 2 is also a grouping of functional units, not necessarily in the same physical location. A typical implementation can be that the units of the secondary station is divided between the base stations RBS1–RBS4, the base station controllers BSC1,BSC2 and the mobile switching center MSC1, as will be discussed more in detail below.

The primary station 100 comprises four major units that are in connection with each other: a primary radio unit (RU) 101 with an antenna 102, a primary control unit (CU) 103, a primary memory unit (MU) 104 and a primary input/output unit 105. The primary input/output unit 105 has connected to it four separate sub-units: a keypad (K) 106, a display (D) 107, a microphone (M) 108 and a loudspeaker (L) 109. Although the keypad 106 and the display 107 are shown as separate units, they can of course be combined into one single unit such as e.g. a "touch screen". It should also be pointed out that these input/output sub-units, keypad 106, display 107, microphone and speaker 108 are merely examples of arrangements for input/output. Other types of units, performing the functions of conveying external input and output to the station 1001 are easily implemented by a person skilled in the art.

The secondary station 200 also comprises four major units that are in connection with each other: a secondary radio unit (RU) 201 with a secondary antenna 202, a secondary control unit (CU) 203, a secondary memory unit (MU) 204 and a secondary input/output unit (I/O) 205. The secondary input/output unit 205 is connected to the mobile switching center MSC1. Although FIG. 2 indicates that the mobile switching center MSC1 is separated from the secondary communication station 200, some or all the parts of the secondary station 200 can be physically located in the switching center MSC1, as discussed above.

Between the two communication stations 100,200 is a radio connection 42 comprising the above mentioned up- and down-channels U1,U2,D1,D2. The radio connection 42 can also comprise one or more control channels through which signaling information is exchanged by the communication stations 100,200. Techniques for implementing the radio connection 42 is well known in the art, and will not be discussed here.

Figure 3:
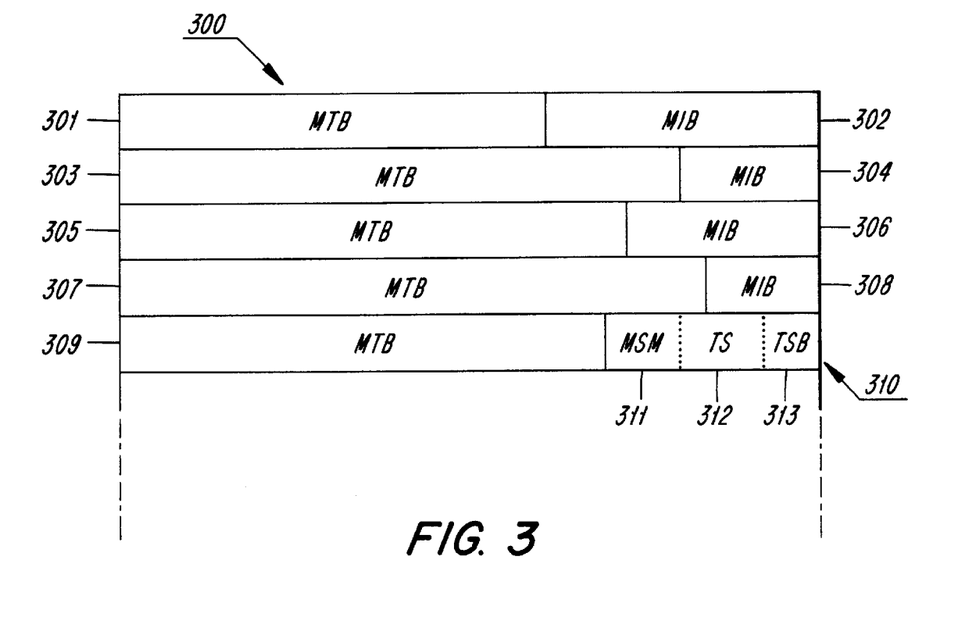
FIG. 3 shows a schematic representation of a memory.

FIG. 3 illustrates schematically a memory unit 300. A physical implementation of a memory unit 300, such as the memory units 104,204 in the primary and secondary stations 100,200 described above, can be made using techniques known in the art. The purpose of illustrating a memory unit 300 is to exemplify contents of the memory 300. As will be described below, the memory 300 can hold message text blocks (MTB) 301,303,305,307,309 and message information blocks (MIB) 302,304, 306,308,310. One message text block 309 and one information block 310 will now be discussed in more detail.

The message text block 309 contains text information, suitably coded in e.g. binary format. The text 309 can represent any form of non-voice data and be of arbitrary length, limited only by the physical limits of the memory 300. As discussed above, the message may contain simple text as well as e.g. files containing coded images and sounds. In the following, the text block 309 represents all these examples of information that is possible to represent as textual information. The information block 310 contains a message size measure (MSM) 311, a time stamp (TS) 312 and an transfer status block (TSB) 313. The size measure 311 is preferably an integer number, stored in a suitably coded format, representing the size of the text block 309. The time stamp 312 is a number, also stored in a suitably coded format, representing a point in time when the message text 309 is transmitted from or to the communication station 100. The transfer status block 313 contains information about a destination address of the message, as well as an indication of whether or not the message has been successfully transferred to the address. The transfer status block 313 may also hold information about actions to take in an event of transmission failure due to e.g. a user switching off the communication station 100. One example of an action is automatic re-transmission of the message at a certain moment in time, calculated from the information in the time stamp 312. Another action that can be represented by information in the transfer status block 313 is to automatically re-transmit the message as soon as the station 100 is switched on after having been switched off. The destination 313 can be a suitable sequence of digits representing the destination, and can be of any format previously known in the art. A typical example is a telephone number to a subscriber in the communication system 1. The part of the transfer status block 313 representing the indication of successful transfer can simply be a flag with the binary values TRUE and FALSE as representing transferred and not-transferred, respectively. Similarly, information about actions to take in the event of interrupted transfer may simply be in the form of an integer number, representing different actions when interpreted by the control unit of the station 100,200.

Returning to FIG. 2, the function of the different units will now be described. It will be assumed that the primary station 100 is operated by a user and can e.g. be represented by the first mobile station MS1 in the mobile system PLMN shown in FIG. 1. The radio unit 201 and the antenna 202 of the secondary station 200 is implemented in the first base station RBS1, and the secondary control unit 203, memory 204 and input/output unit 205 are implemented in the mobile switching center MSC1.

A message is generated by interaction between the user and the primary station through the keypad 106 and the display 107. The user generates the message text 309 and stores the text in the primary memory 104. This message text generation is preferably done by typing on the keypad 106. The primary control unit 103 controls all interaction between the different units, such as the input of text on the keypad 106 through the input/output unit 105. The actual transfer of the text into the primary memory 104 is also controlled by the control unit 103. However, pre-stored text from the memory 104 can also be used. An example being a file of digitally coded sound or a digital image. The time stamp 312 in the information block 310 is also created by interaction through the keypad 106 and display 107, controlled by the control unit 103. The simplest form of time stamp 312 is a number of digits representing the time of day, such as e.g. 08.45 AM or 22.45. However, suitably designed information presentation technique, known in the art, allows the user to simply select predetermined time stamps from e.g. a menu on the display. The control unit 103 is also capable of keeping track of current time. That is, the control unit 103 comprises a clock circuit. However, a clock circuit is not explicitly shown in the figures, since a clock circuit is a feature well known in the art, and need not be described further. The size measure 311 is preferably calculated by the control unit 103 and stored in the information block 310, without user interaction.

The message text 309 is transmitted from the primary station 100 via the primary radio unit 101 and its antenna 102 to the secondary station 200 with its antenna 202 and radio unit 201. As indicated above, the actual way of transfering is known in the art and takes place through the radio connection 42 and may also include transfer of signaling information which is also known in the art.

When received in the secondary station 200, the message text 309 is stored in the secondary memory 204. Similar to the situation in the primary station 100, the secondary control unit 203 controls all interaction between units in the secondary station 200. Depending on the situation, the message text 309 can be transferred from the secondary memory 204 further in the communication system 1, via e.g. the mobile switching center MSC1. However, that is outside the scope of this description and will not be discussed further.

Figure 4:
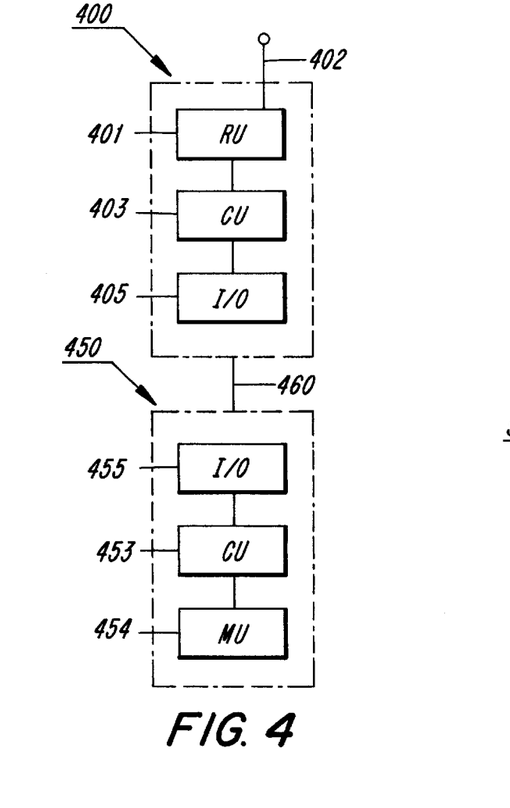
FIG. 4 shows a schematic block diagrams of a second embodiment of a communication station.

FIG. 4 shows a third alternative of an implementation of a communication station 400. The third station 400 comprises a third radio unit 401 with its antenna 402, a third control unit 403 and a third input/output unit 405. Connected to this third station 400 is a computer 450 comprising a computer input/output unit 455, a computer control unit 453 and a computer memory unit (MU) 454.

Figure 5:
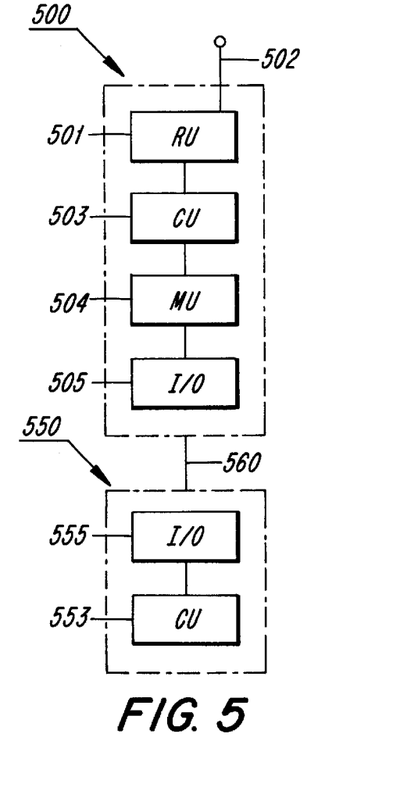
FIG. 5 shows a schematic block diagrams of a third embodiment of a communication station.

FIG. 5 shows a fourth alternative of an implementation of a communication station 500. The fourth station 500 comprises a fourth radio unit 501 with its antenna 502, a fourth control unit 503, a fourth memory unit 504 and a fourth input/output unit 505. Connected to this fourth station 500 is a second computer 550 comprising a second computer input/output unit 555 and a second computer control unit 553.

The examples in FIGS. 4 and 5 illustrate that it is not necessary that a communication station has all functions in one single physical unit. It is possible to have stations consisting of two or more separate units 400,450 and 500, 550 respectively. Between the units 400,450 and 500,550 are connections 460 and 560 respectively. Although shown as physical connections 460,560 it is of course within the known art to implement these connections 460,560 as e.g. radio connections over an air interface.

With reference to FIGS. 6 to 9 and FIGS. 1, 2 and 3, embodiments of methods according to the invention will now be described. First, a method of controlling transfer of messages from a mobile communication station MS1,100 to a communication station 200 residing in the network PLMN, will be described. Next, referring to FIGS. 7 and 8, follows a description of a method of controlling transfer of messages that have been interrupted during transmission. A method of controlling transfer of messages from a station residing in the network PLMN to a mobile communication station MS2,100 will then be described with reference to FIG. 9.

The methods will be described in functional terms and are preferably implemented as software running in the control units 103,203 of the stations 100,200. This means that steps in the methods comprising an action such as pressing of a key on a keypad, does not imply that it is the actual pressing that initiates the desired action. Rather, a pressing of a key on a keypad should be interpreted as an action which sends a signal to the software program running in the respective control unit and by that initiating the desired action.

Figure 8:
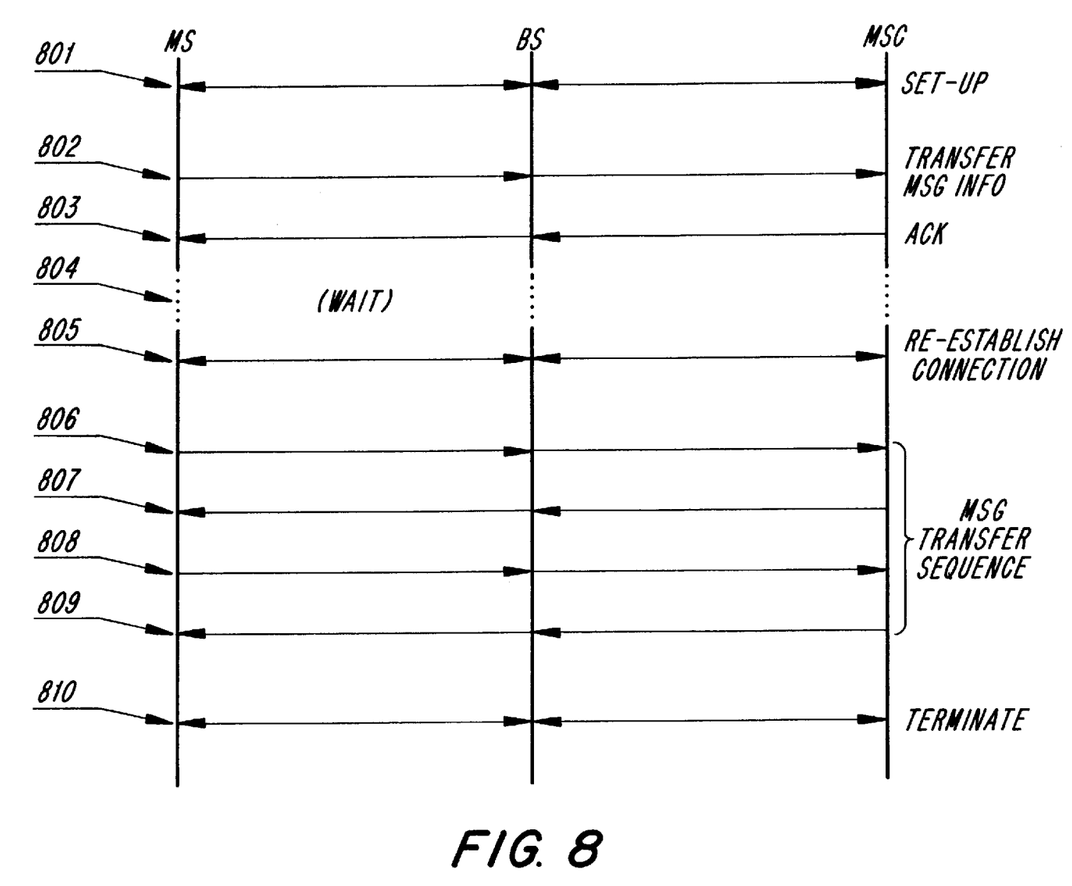
FIG. 8 shows a schematic signaling diagram.

It should be pointed out that the methods, as they will be described below, only implicitly describe signaling procedures between the communication stations that are involved. Explicit and detailed descriptions of signaling procedures are outside the scope of this invention. All necessary signaling procedures necessary for implementing the invention are known in the art, although variations in implementations exist between different telecommunication systems. However, a simplified and schematic description of signaling between stations will be described in connection with the second method, as shown in FIG. 8.

Figure 6:
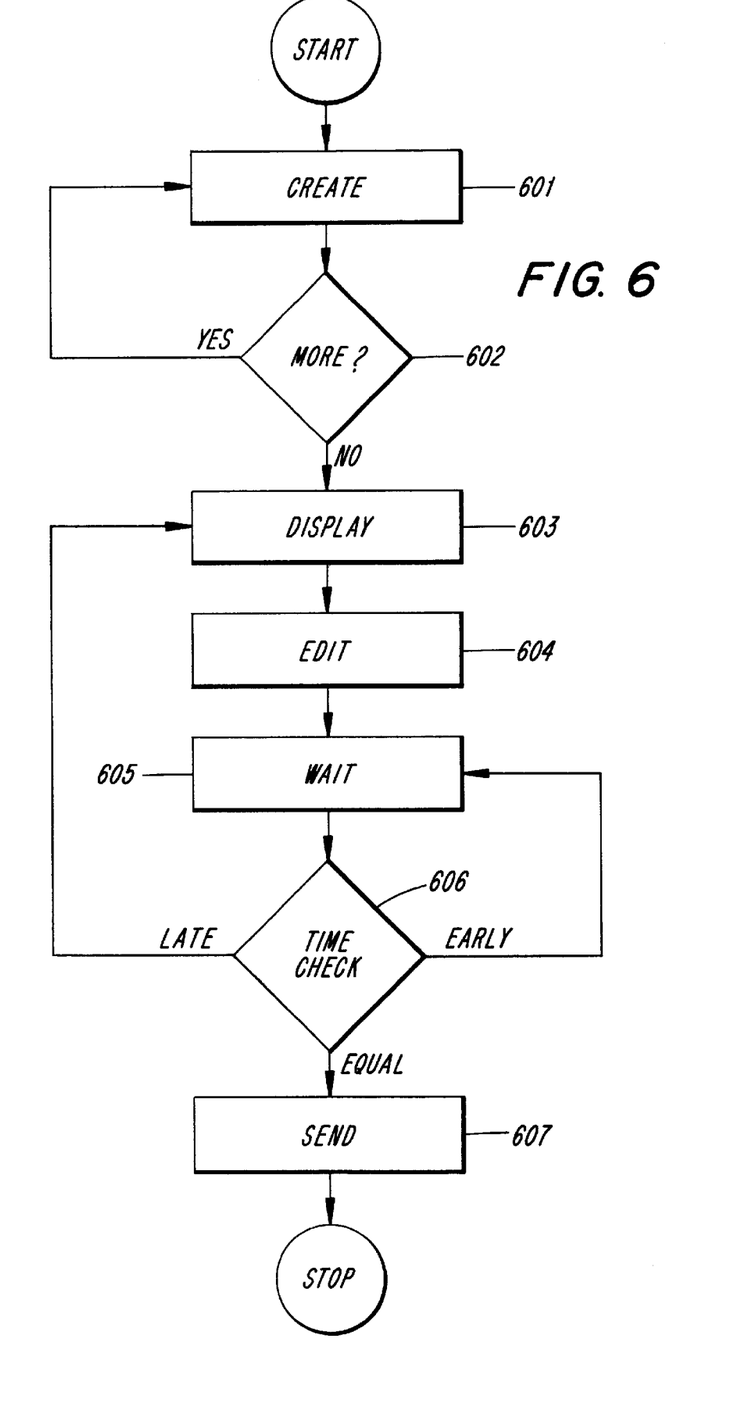
FIG. 6 shows a schematic flowchart of an embodiment of a method according to the invention.

FIG. 6 illustrates a method comprising the steps:

In step 601 a message is created by a user of the mobile station MS1,100. As well as creating the text block 309, the user specifies the time stamp 312 which determines at which point in time the message is to be sent. The time stamp 312 can be a number such as e.g. 6.45 AM and 22.10. The size measure 311 in the information block 310 is preferably not input by the user, rather, it is calculated and stored in the information block by the control unit 103. In practical terms the creation of the message is made by the user interacting with the mobile station through the keypad 106 and the display 107. A further detailed description of the keypad- and display interaction is unnecessary here since it is already very well known in the art. However, it should be pointed out that typing a message does not necessarily mean that each and every character of the text block 309, or information block 310, must be typed one by one. Message text and information may be already present in the mobile station MS,100, and simply recalled by pressing a single or a few keys on the keypad 106.

In step 602 a choice is made, whether to create another message or not. In practice this can be done, as known in the art, by pressing a key on the keypad 106.

In step 603 at least part of the message is displayed on the display 107 of the mobile station. Depending on the type of display, more or less of the message content is displayed. Even if only part of the message, text block 309 and information block 310, can be displayed at the same time, it is within the framework of known art to enable the user to see the whole message by, e.g., pressing a key on the keypad 106. At least part of the information block 310 is displayed as well, and as for the text block 309, the individual blocks 311,312,313 of the information block 310 can be displayed individually or together by, e.g., pressing a key on the keypad 106.

In step 604 the user edits at least part of the message. The user changes the contents of the time stamp block 312, which after the editing contains new information about when the message is to be sent.

Step 605 is a waiting step. The present method does not prescribe any particular activity taking place during this step. An example of activity can be that the user of the station 100 establishes a voice connection with another subscriber in the network 1. Another example is that the station 100 is deactivated or switched off, an action well known in the art. The length of the waiting time period is also not dictated by the present method, and can thus be either short or long.

In step 606 the control unit 103 of the station 100 compares the time stamp 312 with current time. If the comparison results in that current time is equal to the time stamp, the method continues with step 607. If the comparison results in that the time stamp 312 is larger than current time, the method returns to the waiting step 605. If the comparison results in that the time stamp 312 is less than current time, the method returns to the display step 603.

In step 607 the message is sent to the destination determined by the contents of the transfer status block 313.

Although the above described method refers only to one message, it is obvious that more than one message can be handled as described.

Figure 7:
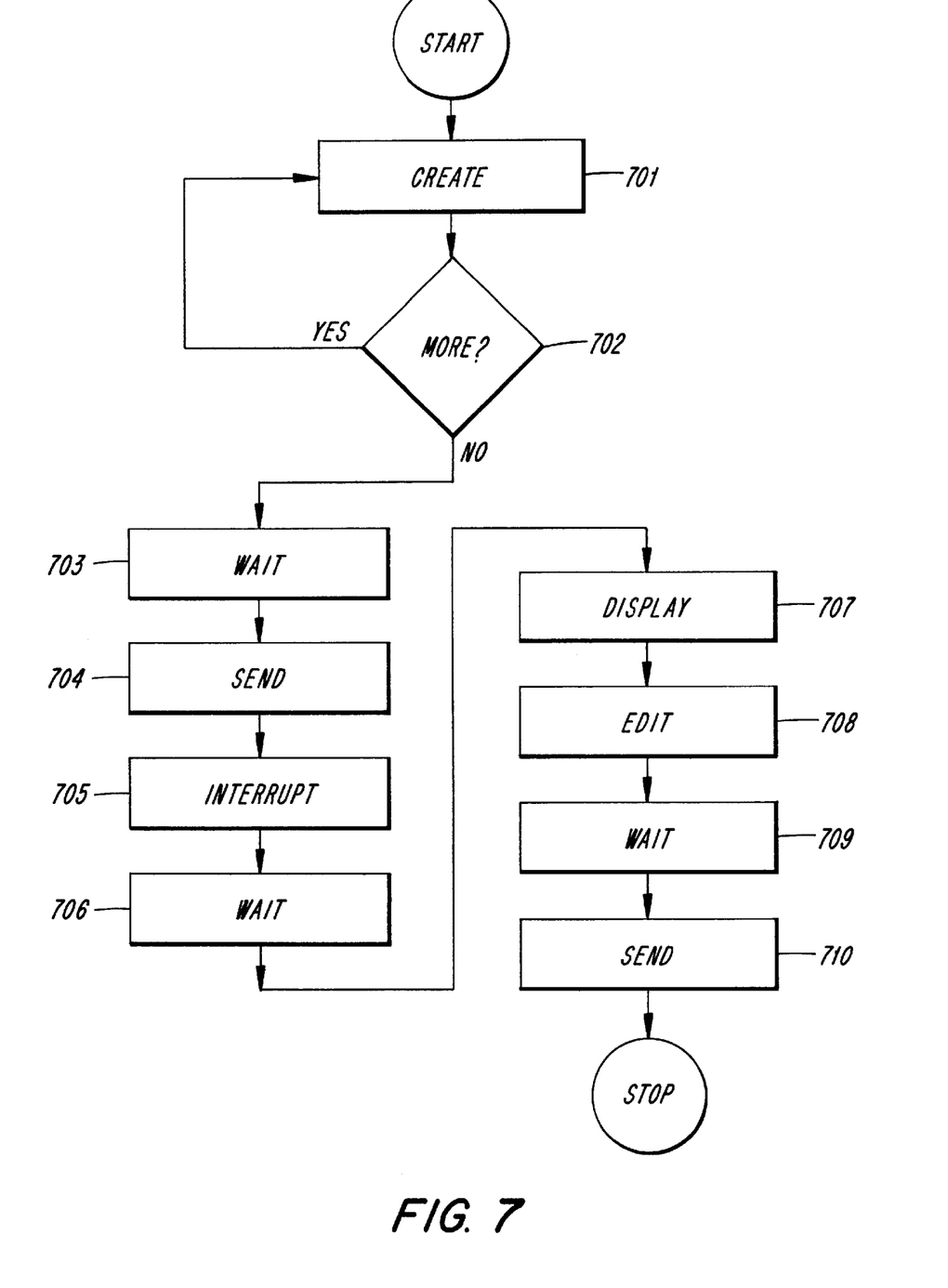
FIG. 7 shows a schematic flowchart of a second embodiment of a method according to the invention.

FIG. 7 shows a flowchart of a second embodiment of a method according to the invention. A method of controlling transfer of messages is shown, including steps handling an interruption of message transfer. A realistic setting for this method is when a user of a mobile station MS1 creates one (or more) messages, at least one of which messages is comparably large in size and thus may take a sizable amount of time to transfer. The message has been associated with the time stamp 312 as disclosed in connection with FIGS. 3 and 6. In order to enable the user to make an ordinary voice-call before the message is transferred, the large message has been allocated the time stamp 312 denoting transmission at a later time, automatically controlled by the control unit 103 in the station MS1. Also, the destination block 313 will contain information to the effect that if a transmission is prematurely terminated, automatic transfer attempts will be made at regular intervals. During the ensuing transmission of the large message, the user is forced to abruptly switch off the mobile station MS1, and wait some time before being able to switch it on again. When the station MS1 is switched on again, the information stored in the destination block 313 will lead to a re-transmission commencing. However, the user has to make an urgent voice-call that can not wait until the (large) message has been transferred, and decides to instruct the station MS1 not to continue the message transfer until the voice-call has terminated. Hence, the user edits the information block 310 of the message, by changing the information in the destination block 313. When the voice-call is terminated, the control unit 103 automatically begins a re-transmission of the message.

With reference to FIG. 7, a method in accordance with the invention, following the scenario described above, comprises the steps:

- In step 701 a message is created by a user of the mobile station MS1,100. The text block 309 of the message is composed of previously recorded and digitally coded sound data stored in the station 100, using technique known in the art. The user also specifies the time stamp 312 which determines at which point in time the message is to be sent. The size measure 311 is calculated and stored in the information block 310 by the control unit 103. The information in the destination block 313 regarding actions in case of interrupted transfer is also input. By selecting from, e.g., a menu on the display 107 the action chosen is to automatically re-transmit any message which is interrupted as a result of switching off the station 100. The re-transmission will take place at the earliest possible moment in time when the station 100 is switched on again.

- In step 702 a choice is made that no more messages are to be created.

- Step 703 is a waiting step, during which the user of the mobile station MS1 is making an ordinary voice-call. The designation as a waiting step has been made in order to clarify that the actual waiting is in the context of message transfer. Any event outside the scope of the invention may of course also take place during this step.

- In step 704 the time stamp 312 associated with the message coincide with the time as recorded by the control unit 103 of the station 100. This leads to a commencement of message transmission.

- In step 705 the ongoing message transfer is interrupted by the user, who switches off at least the radio unit 101 in the communication station MS1,100.

- Step 706 is a waiting step. No limit on the duration of this step is dictated by the invention. Any duration is conceivable, from momentary interruptions of a second or less, up to a duration of several days or more.

- Step 707 is a step in which the user elects, immediately after having switched on the communication station MS1, to display at least part of the message information block 309. This step 707 is analogous to step 603 in the previous example.

- During step 708 the user edits the information block 309, in order to temporarily prevent transmission of the message. As described above, this action may in practical terms mean one or a few keypad actions.

- Step 709 is a waiting step similar to step 703, during which step 709 an ordinary call is made by the user.

- In step 710, after the ordinary call is terminated, message transfer is automatically continued. As mentioned above, the control of exactly when the continuation of the message transfer is by means of software running in the control unit 101.

In FIG. 8 can be seen a simplified signaling diagram showing signaling sequences 801–810 between a mobile unit MS, a radio base station BS and a switching center MSC. The mobile station MS is in this context a first communication station 100, and the base station BS and the switching center MSC together acts as a second communication station 200, as shown in FIG. 2. The radio unit 201 in the second station 200 is located in the base station BS, whereas the remaining units in the second station 200 is located in the switching center MSC.

The signaling sequences 801–810 are not described in detail, only directions of transfer and relative order is shown. All specific details regarding signaling between units in a system PLMN is already well known in the art. Hence, to emphasize that the invention is applicable in any type of system, such as e.g. GSM and AMPS/D-AMPS, PDC etc., information about implementation of e.g. logical and physical channels, coding schemes and transfer rates is omitted. All omitted details are assumed to be known to the person skilled in the art.

- Signal sequence 801 is a connection set-up sequence. A connection is set up between the mobile station MS and the switching center MSC via the base station BS. The sequence 801 is shown as taking place at one instant in time, with signaling in directions both from and to the participating units MS,BS and MSC. However, depending on implementation, this step 801 may of course comprise many more subsequences, with signaling taking place over a period of time.

- Signal sequence 802 illustrates transfer of message information from the mobile station MS to the switching center MSC.

- Signal sequence 803 shows that the switching center MSC acknowledges receipt of the information transferred in the previous sequence 802.

The above described three sequences 801–802 take place during the first transfer step 704 described above in connection with FIG. 7.

- The dotted line 804 represents the combined waiting steps 706 and 709 as described above.

- Signal sequence 805 represents a re-establishment of connection between the stations MS,BS,MSC. This sequence 805 is identical to sequence 801 described above.

- Signal sequences 806 to 809 represent message transfer sequences 806,808 and receipt acknowledge sequences 807,809. Together with sequence 805, these sequences 806–809 take place during step 710 as described above in connection with FIG. 7.

- Signal sequence 810 is a connection termination sequence which, similar to set-up sequences 801 and 805, may comprise several sub-sequences.

Figure 9:
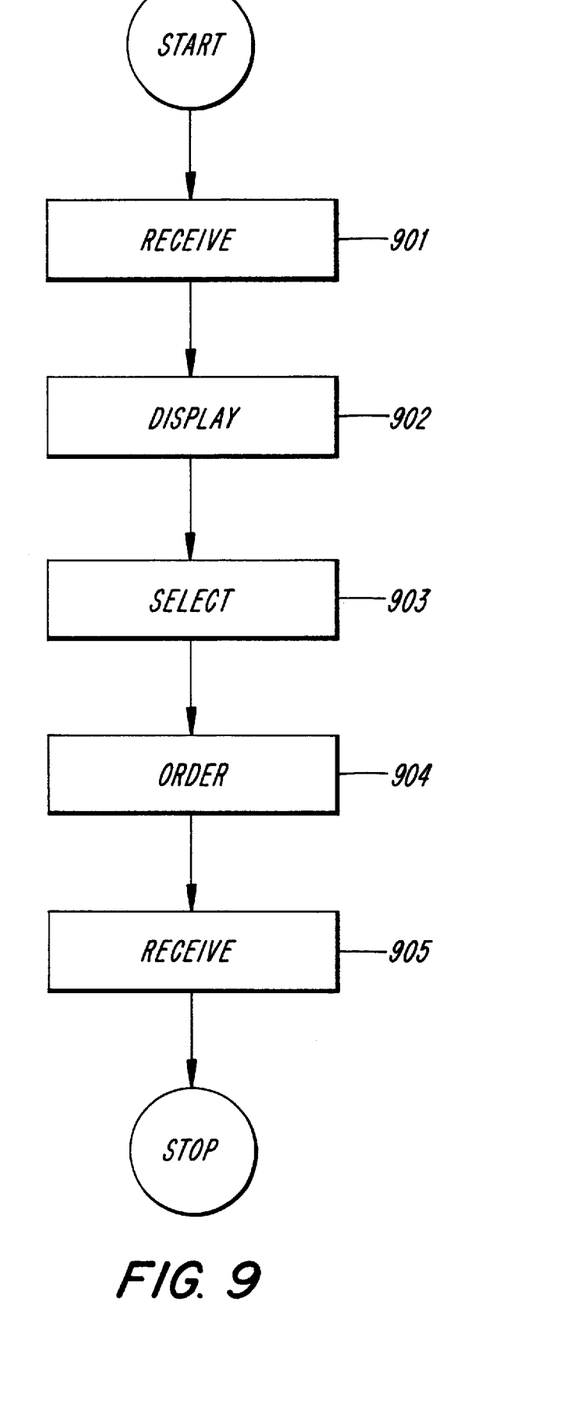
FIG. 9 shows a schematic flowchart of a third embodiment of a method according to the invention.

FIG. 9 illustrates a third method according to the invention, where message transfer takes place in an opposite direction as compared to the previous examples. A message is present in the secondary station 200. Associated with the message is the information block 310, as in the previous examples, comprising information about when in time the message text 309 is to be transferred to the mobile station MS,100.

The method comprises the steps:

- In step 901 the information block 310 of the message is transferred from the second station 200 to the first station 100. It is assumed that this takes place after a connection has been setup between the stations 100, 200. As discussed above it is outside the scope of the invention to describe connection setup, and it is assumed that persons skilled in the art comprehend setup procedures. It is also within the realm of known art that the transfer of at least part of the message information block 310 may coincide with a connection setup procedure, although it is also possible that information block 310 transfer may take place as a separate step after connection setup.

In step 902 the message information block 310, or at least part of it, is displayed on the display unit 107 of the first communication station.

In step 903 a user of the first station 100 selects whether or not the message text 309 of the message, should be transferred or not. Along the lines of previous examples, the user may have several choices of when the message text 309 is to be transferred. The user may decide that immediate transfer is to be preferred, or he may select a later time to transfer the text 309. In any case, the user makes a selection which is input to the station 100 in the form of e.g. a menu selection, as discussed above. In this particular example, the user elects to select immediate transfer of the message text 309.

In step 904 an order is sent to the second station 200 instructing the second station to take action according to the selection which was made in the previous step 903.

In step 905 the first station receives the message text sent by the second station 200.

This third example of message transfer also comprises signaling sequences similar to those described above in connection with FIG. 8. It is also possible to conceive other examples where message transfer from the second station 200 to the first station 100 is interrupted. However, persons skilled in the art may easily combine different features from the examples described above, and by that finding support for the scope of the following claims.

What is claimed is:

1. A method in a telecommunication system for controlling transmission of messages from a first communication station to a second communication station, said first communication station capable of controlling transmission, capable of keeping track of current time, capable of message generation and capable of transmitting, said second communication station capable of receiving, said method comprising the steps:

generating at least one message text in the first communication station;

generating an information block associated with the message;

generating in said information block a transmission time stamp, said time stamp comprising information about a point in time when the message is to be transmitted;

generating in said information block a transmission status indicator that comprises information regarding an amount of transmitted message content;

comparing the transmission time stamp with current time, said comparison generating at least one result;

interpreting the result of the comparison and as a consequence of the interpretation commencing a transmission of the message from the first communication station to the second communication station.

2. A method according to claim 1, further characterized in that at least part of the message text is generated in a format representing facsimile data.

3. A method according to claim 1, further characterized in that at least part of the message text is generated in a format representing an image.

4. A method according to claim 1, further characterized in that at least part of the message text is generated in a format representing sound.

5. A method according to claim 1, further characterized in that the generation of the information block is at least partly performed by reading predetermined information stored in either of the communication stations.

6. A method according to claim 1, said method further characterized in that the generation of the information block is at least partly performed by receiving externally generated information.

7. A method according to claim 1, further characterized in that the generation of the message is at least partly performed by reading predetermined information stored in either of the communication stations.

8. A method according to claim 1, said method further characterized in that the generation of the message is at least partly performed by receiving externally generated information.

9. A method according to claim 1, further characterized by the steps:

monitoring the transmission with respect to the amount of transmitted message content; and recording the amount of transmitted message content.

10. A method according to claim 1, further characterized in that said status indicator comprises information about actions to perform in an event of transmission interruption.

11. A method according to claim 13, further characterized in that the action to perform in the event of transmission interruption is to re-transmit the message.

12. A method according to claim 1, the first communication station also being capable of displaying information, said method further characterized by the step:

displaying at least part of the information block.

13. A method according to claim 1, said method further characterized by the step:

editing at least part of the information block.

14. A method in a telecommunication system for controlling transmission of messages to a first communication station from a second communication station, said first communication station capable of controlling transmission, capable of keeping track of current time and capable of transmitting, said second communication station capable of message generation, capable of transmitting, said method comprising the steps:

generating at least one message text in the second communication station;

generating an information block associated with the message;

generating in said information block a transmission time stamp, said time stamp comprising information about a point in time when the message is to be transmitted;

generating in said information block a transmission status indicator that comprises information regarding an amount of transmitted message content;

transmitting the information block from the second communication station to the first communication station;

comparing the transmission time stamp with current time, said comparison generating at least one result;

interpreting the result of the comparison and as a consequence of the interpretation commencing a transmission of the message from the second communication station to the first communication station.

15. A method according to claim 14, said method further characterized in that the comparison and the interpretation is done in the first communication station, and that the method also comprises the step:

transmitting an order from the first communication station to the second communication station, said order instructing the second communication station to transmit the message to the first communication station.

16. A communication station in a telecommunication system, said station comprising:

means for transmission control, means for keeping track of time, means for generating a message, means for generating an information block associated with the message, said information block comprising a time stamp that includes information about a point in time when the message is to be transmitted, said information block also comprising a transmission status indicator that includes information regarding an amount of transmitted message content, said transmission control means comprising means for comparing the time stamp with current time, means for interpreting a result from the means for comparing, and means for initiating transmission of the message based on the interpretation of said result.

17. A communication station according to claim 16, characterized in that the station consists of at least two separate units, said units comprising means for communication between the units.

18. A communication station according to claim 16, characterized in that the means for generating a message comprise means for generating facsimile data.

19. A communication station according to claim 16, characterized in that the means for generating a message comprise means for generating the message in a format representing an image.

20. A communication station according to claim 16, characterized in that the means for generating a message comprise means for generating the message in a format representing sound.

21. A communication station according to claim 16, characterized in that the means for generating a message comprise means for receiving externally generated information.

22. A communication station according to claim 16, characterized in that the communication station comprises at least one mobile telephone.

23. A communication station according claim 16, characterized in that the communication station comprises at least one computer.

24. A communication station according to claim 16, characterized in that the communication station comprises at least one mobile telephone and one computer.

* * * * *